United States Patent

Holzhei

[15] 3,673,772

[45] July 4, 1972

[54] IMPACT MOWING MACHINE

[72] Inventor: Don Earl Holzhei, Reese, Mich.

[73] Assignee: Deere & Company, Moline, Ill.

[22] Filed: Dec. 17, 1970

[21] Appl. No.: 99,142

[52] U.S. Cl. .................................... 56/13.1, 56/DIG. 8
[51] Int. Cl. .................................................. A01d 45/30
[58] Field of Search ............... 56/12.8, 12.9, 13.1, 13.3, 56/13.4, DIG. 8

[56] References Cited

UNITED STATES PATENTS

| | | | |
|---|---|---|---|
| 1,134,443 | 4/1915 | Engle | 56/12.9 |
| 3,331,195 | 7/1967 | Heth et al. | 56/13.1 |
| 3,070,940 | 9/1971 | Van der Lely | 56/13.3 |

Primary Examiner—Antonio F. Guida
Attorney—H. Vincent Harsha, Harold M. Knoth, William A. Murray, John M. Nolan and Jimmie R. Oaks

[57] ABSTRACT

A cylindrical mower rotor has a pair of blades fixed along diametrically opposite sides thereof and the rotor is transversely and horizontally mounted in a fore-and-aft extending housing. The rotor is driven such that the blades are moving forwardly when they reach the lower portion of their path of travel. The blades are angled to cause air to be drawn in through a duct in the forward end of the housing and the duct is so shaped and located that the air discharging therefrom creates a vacuum which lifts the grass just forwardly of the cutting blades at the lower portion of their path of travel. The lower surface of the duct includes a portion which is lower than the cutting height of the mower and which serves to bend the grass into a dense mat to prevent objects from being thrown from under the housing by the mower blades.

18 Claims, 2 Drawing Figures

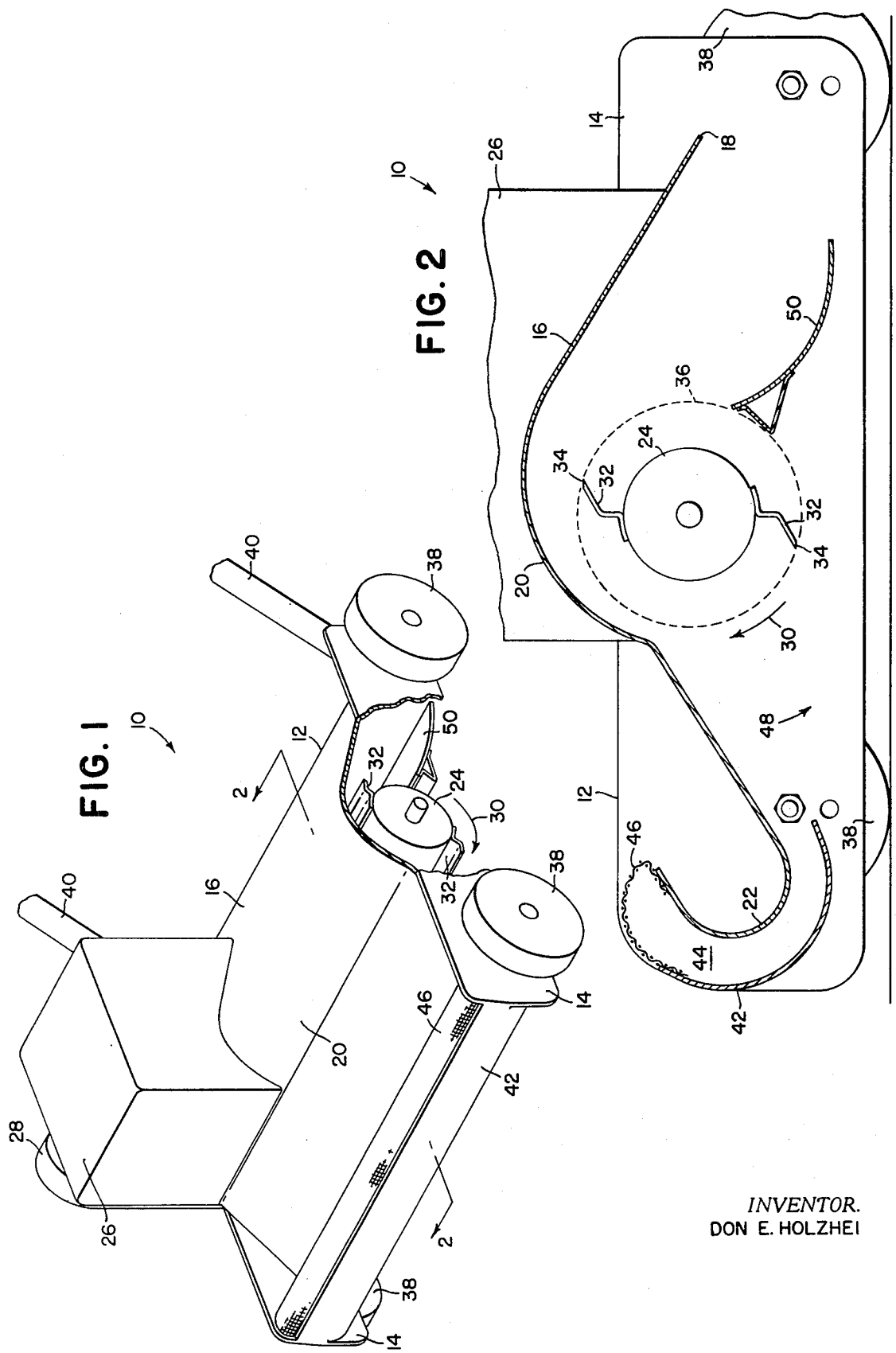

IMPACT MOWING MACHINE

BACKGROUND OF THE INVENTION

The present invention relates to a mower of the impact cutting type, and more particularly, relates to a mower, of the impact cutting type, which has a horizontal blade-carrying rotor.

In the past, impact cutting of lawns has not been widely accepted since the cut was not "clean" and the ends of the grass would tend to turn brown, giving an undesirable appearance to a lawn.

Also attendant with impact cutting is the problem of safety since the cutting blades must travel much faster than is necessary in mowers wherein a cutter bar is used, and as a result are more dangerous.

SUMMARY OF THE INVENTION

According to the present invention, there is provided a novel mower of the impact cutting type.

It is an object of the invention to provide an impact cutting mower, which will "cleanly" cut grass and, which is safe to operate.

Specifically, it is an object of the invention to provide a mower blade housing having an air duct, through which air is drawn by the blades, which duct directs the air to cause a vacuum for lifting the grass into a position for being "cleanly" cut by the blades. A further object is to provide a duct which is positioned along the forward end of the housing and is low enough to bend over uncut grass to provide a mat for preventing hard objects thrown by the blades from passing underneath the forward edge of the housing. Still another object is to provide a duct which is curved to prevent objects from being thrown therethrough by the mower blades.

These and other objects will become apparent from the ensuing description and the appended drawing.

BRIEF DESCRIPTION OF THE DRAWING

FIG. 1 is a partial perspective view of a mower embodying the present invention and showing portions thereof broken away.

FIG. 2 is a longitudinal sectional view taken along the line 2—2.

DESCRIPTION OF THE PREFERRED EMBODIMENT

Referring to the drawing, there is shown a hand-pushed lawn mower 10, which is of the impact cutting type. The mower 10 includes a housing 12 having opposite fore-and-aft extending vertical sides 14 joined by a top 16. The top 16 extends upwardly and forwardly from a rear transverse edge 18 to an arcuate upper portion 20 from whence it extends downwardly and forwardly to a reversely curved front portion 22.

Extending horizontally between, and rotatably mounted in the sides 14, is a cylindrical rotor 24. A diagrammatically illustrated motor, indicated at 26, is drivingly connected to the rotor 24 through means of a drive belt or chain (not shown) located in the cover 28. The rotor 24 is driven in the direction indicated by the arrow 30. A pair of cutting blades 32 are affixed along diametrically opposite sides of the rotor 24 and extend first radially outwardly from the rotor and then angularly in the direction of rotation. The blades terminate in sharpened cutting edges 34 which trace a path or cutting circle 36, indicated by the dashed line in FIG. 2. The path 36 includes an upper forward portion which is spaced slightly from and generally conforms to the lower forward part of the arcuate top portion 20 of the housing. The cutting height of the mower 10 is governed by vertically adjustable gauge wheels 38, which are selectively adjustable to dispose the cutting circle 36 at different heights relative to the ground. Fixed for pushing the housing 12 over the ground is a handle shown partially at 40.

The forward end of the housing 12 includes a plate 42 which is spaced from and is generally parallel to the curved front end 22 of the top 16. The plate 42 and the end 22 cooperate to define a duct 44 through which air is drawn by the cutting blades 32. A screen 46 is fixed over the inlet to the duct 44 to prevent the ingestion of foreign matter into the housing 12. The upward lift given to the air as it passes through the upwardly curved rear end of the duct 44, creates a vacuum adjacent the rear edge of the plate 42. This vacuum lifts the grass so that it is favorably oriented at the region 48, forwardly of the cutting blades 32, for being "cleanly" cut by the blades 32. The stream of air directed by the duct 44 also aids in carrying grass clippings over the top of the rotor 24 and thus aids in keeping the housing 12 clean. In order to keep the clippings from being recirculated through the housing 12, there is provided a baffle or stripper plate 50, which extends transversely between the housing sides 14 at a location closely adjacent the lower rear portion of the cutting circle 36.

It is to be noted that the forward plate 42 of the housing is low enough to effectively bend down grass to form a mat at the forward clearance between the housing 12 and the ground to prevent hard objects impelled by the cutting blades 32 from passing under the forward end of the housing 12 and the curvature of the duct 44, together with the screen 46, prevents objects from being thrown forwardly through the duct 44. Also, it is to be noted that due to the fact that the rotor 24 is driven so that the blades 32 cut while moving away from an operator grasping the handle 40, there is little likelihood that hard objects will be carried over the rotor and discharged rearwardly.

The foregoing is thought to adequately describe the operation of applicants' invention, and, for the sake of brevity, no further discussion is given.

I claim:

1. A lawn mower, comprising: a mobile frame having a normal forward direction of travel and including a housing having an open bottom and being supported for movement closely adjacent the ground, said housing further including a pair of transversely spaced, fore-and-aft extending side walls; a transversely extending rotor having opposite ends rotatably mounted in said sides, blade means fixed rigidly to said rotor and having transversely extending cutting edge means located equidistant from the axis of rotation of said rotor, said cutting edge means thus tracing a cylindrical path during rotation of the rotor; said housing further having a top wall joining said side walls, said top wall being arched over said rotor and extending between and including leading and trailing end portions, the leading end portion and the bottom of the side walls being at a level no higher than the bottom of said cylindrical path and the trailing end portion being at a level approximately the same as the axis of rotation of the rotor, an air duct having an inlet extending transversely across and being adjacent the front of the housing, the duct extending into the housing forwardly of said cylindrical path and having an upwardly and rearwardly directed discharge opening extending transversely across and being located in the lower part of the housing at approximately the same height as the bottom of said cylindrical path and being spaced from the latter and from the top of the housing so as to cause a vacuum to be formed immediately forwardly of the bottom of said cylindrical path when air is flowing from said discharge opening; said blade means being configured for drawing a substantial amount of air in through said duct during rotation of the rotor, the blade means being the sole means for causing air to pass through said duct during rotation of the rotor; and motor means mounted on said frame and being operatively connected to said rotor for rotating the latter in a direction for carrying the blade means forwardly along the bottom portion of said cylindrical path.

2. The invention defined in claim 1 wherein the duct has a bottom wall, a portion of which is positioned below the level of the bottom of said cylindrical path for engaging and bending over grass along the forward underside of the housing, whereby the grass will form a mat for impeding the passage of hard objects thrown by the cutting blades.

3. The invention defined in claim 1 wherein the duct is curved between its inlet and discharge openings whereby objects thrown by the blades are impeded in their passage through the duct.

4. The invention defined in claim 2 wherein the duct is curved between its inlet and discharge openings whereby objects thrown by the blades are impeded in their passage through the duct.

5. The invention defined in claim 1 wherein the top and side walls of the housing form the top and side walls of the duct and said housing further including a front plate forming the bottom wall of said duct.

6. The invention defined in claim 2 wherein the top and side walls of the housing form the top and side walls of the duct and said housing further including a front plate forming the bottom wall of said duct.

7. The invention defined in claim 3 wherein the top and side walls of the housing form the top and side walls of the duct and said housing further including a front plate forming the bottom wall of said duct.

8. The invention defined in claim 4 wherein the top and side walls of the housing form the top and side walls of the duct and said housing further including a front plate forming the bottom wall of said duct.

9. The invention defined in claim 1 and further including baffle means extending coextensively along, and adjacent to the lower rear portion of said cylindrical path for preventing the recirculation of cuttings about the rotor and for preventing air from being drawn in from the rear of the housing.

10. The invention defined in claim 2 and further including baffle means extending coextensively along, and adjacent to the lower rear portion of said cylindrical path for preventing the recirculation of cuttings about the rotor and for preventing air from being drawn in from the rear of the housing.

11. The invention defined in claim 3 and further including baffle means extending coextensively along, and adjacent to the lower rear portion of said cylindrical path for preventing the recirculation of cuttings about the rotor and for preventing air from being drawn in from the rear of the housing.

12. The invention defined in claim 4 and further including baffle means extending coextensively along, and adjacent to the lower rear portion of said cylindrical path for preventing the recirculation of cuttings about the rotor and for preventing air from being drawn in from the rear of the housing.

13. The invention defined in claim 1 wherein the forward end of said top wall is curved rearwardly and upwardly and said housing further including a transverse front plate extending between said side walls and being disposed generally parallel to the front end of said top wall, said top wall, side walls and front plate cooperating to form said air duct.

14. The invention defined in claim 2 wherein the forward end of said top wall is curved rearwardly and upwardly and wherein the bottom wall of said duct comprises a transverse front plate extending between said side walls and being disposed generally parallel to the front end of said top wall, said top wall, side walls and front plate cooperating to form said air duct.

15. The invention defined in claim 3 wherein the forward end of said top wall is curved rearwardly and upwardly and said housing further including a transverse front plate extending between said side walls and being disposed generally parallel to the front end of said top wall, said top wall, side walls and front plate cooperating to form said air duct.

16. The invention defined in claim 4 wherein the forward end of said top wall is curved rearwardly and upwardly and wherein the bottom wall of said duct comprises a transverse front plate extending between said side walls and being disposed generally parallel to the front end of said top wall, said top wall, side walls and front plate cooperating to form said air duct.

17. The invention defined in claim 1 wherein said rotor is cylindrical and wherein said blade means includes a pair of diametrically opposite blades having continuous cutting edges extending along the entire length of the rotor.

18. The invention defined in claim 17 wherein said blades extend radially and then angularly from said rotor to the respective cutting edges in the direction of travel from the rotor.

* * * * *